Figures 1, 2, 3:
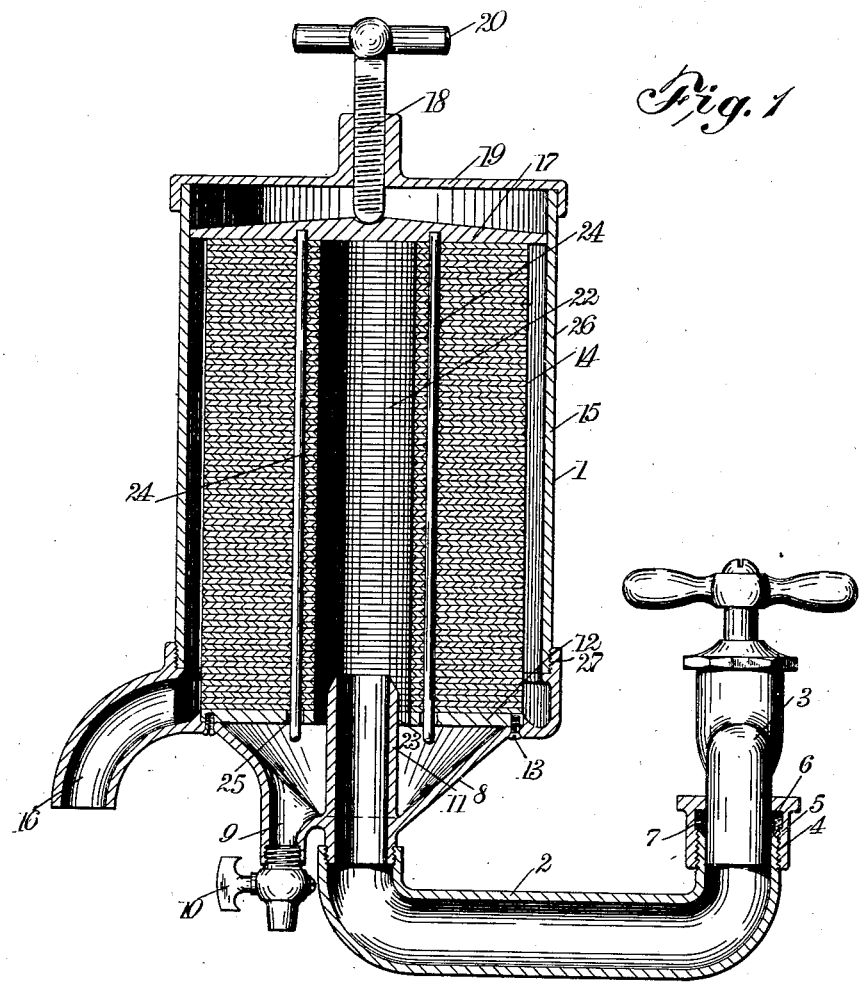

E. SEAVEY.
FILTER.
APPLICATION FILED MAY 26, 1911.

1,035,248.

Patented Aug. 13, 1912.

WITNESSES

INVENTOR
Eugene Seavey
BY
ATTORNEYS

UNITED STATES PATENT OFFICE.

EUGENE SEAVEY, OF NEW YORK, N. Y.

FILTER.

1,035,248.  Specification of Letters Patent.  Patented Aug. 13, 1912.

Application filed May 26, 1911. Serial No. 629,557.

*To all whom it may concern:*

Be it known that I, EUGENE SEAVEY, a citizen of the United States, and a resident of the city of New York, borough of Manhattan, in the county and State of New York, have invented a new and Improved Filter, of which the following is a full, clear, and exact description.

This invention relates to a new and improved filter for filtering any desired liquid material, such as sugar solution, water or petroleum.

An object of this invention is to provide a filter embodying a plurality of disks placed face to face, so that the fluid can percolate through the juxtaposed disks, and thereby strain the foreign particles, with means for adjusting the degree of intimacy with which the disks engage each other, so that these disks can be held in their close contact, filtering the fluid thoroughly, or so that they can be allowed to play loosely, so that the fluid passing between them will wash out the sediment. It will be seen by this means that when it is desired to filter, the filtering disks can be quickly brought into filtering contact, and further, when it is not desired to filter, the full pressure of the liquid under head can be obtained without obstruction due to the filtering action, so that the flow will be at the usual high rate of speed which would be obtained if no filter were attached.

A further object of this invention is to provide means whereby the sediment and foreign particles filtered out from the liquid can be collected in a catch-basin and at suitable intervals removed from the filter.

Another purpose of the invention is to employ wood as the material for the disks.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1 is a vertical section; Fig. 2 is a perspective view of one form of filtering disk; and Fig. 3 is a perspective view of another form of filtering disk.

Referring more particularly to the separate parts of this invention as embodied in the form shown in the drawings, 1 indicates the filter proper, which is connected at one end by means of a pipe 2 to a faucet 3 or other source of supply of the liquid to be filtered. In this instance, the pipe 2 is shown as being screw-threaded at 4, so as to be forced into engagement with the faucet 3 by a nipple 5, screw-threaded to engage the screw-threaded portion of the pipe 2. A suitable fiber ring 6 may be located between the nipple 5 and the faucet 3. There may be also provided suitable packing material 7, which is packed tight around the faucet 3 by the upper edge of the screw-threaded portion 4 of the pipe 2 being beveled so as to wedge the packing material in place.

The filter 1 is provided at the bottom with a catch-basin 8, which is shown as being somewhat conical, and having an outlet 9 controlled by a pet-cock 10, through which the sediment accumulated in the filter can be removed from time to time. Extending up through the catch-basin 8, so as not to have the fluid flowing through contaminated by the sediment in the catch-basin 8, there is provided a feeding nozzle 11, an extension of which is secured to the pipe 2 and has its interior communicating with the interior of the pipe 2.

Secured to the catch-basin 8, which forms one head of the filter 1, in any suitable manner, as by means of screws 13, there is provided a diaphragm or false bottom 12, which forms a support for a series of superposed filtering disks 14, made of wood and preferably having their contacting surfaces roughened slightly, so as to strain out the particles of dirt and foreign matter in the liquid being filtered, from the body of the liquid. The disks 14 are of less magnitude than the internal cross-sectional area of the casing 15 of the filter 1, so that the water filtering between the disks can collect in the casing and come out at the outlet nozzle 16 provided for this purpose. The disks 14 are held in intimate contact with each other by a pressure head or plate 17, which is forced downwardly by means of an adjuster 18, which in this instance is shown in the form of a screw, having a screw-threaded engagement with a head 19 of the filter 1, and having a handle 20 on the top thereof, whereby it may be operated. It will be noted that the disks 14 are each provided with a central opening 21, which, when the disks are stacked one on top of the other, extend in alinement with each other to form a vertical passage 22, into which the water coming from the nozzle 11 enters the stack of piled-up disks. It will be noted that this passage 22 is of greater magnitude than the outside magnitude of the nozzle 11, so that any slime or dirt collecting on the sides of the passage can pass down through an opening 23 in the diaphragm 12, which extends in alinement with the openings 21. The disks 14 are held in register with each other by means of pins 24, which are secured to the pressure plate 17, and are loosely mounted in openings 25 in the diaphragm 12.

The disks 14, as above stated, are made of wood and may be plain, as indicated in Fig. 2, without any openings other than those through which the pins 24 extend, or they may be perforated at suitable intervals, as indicated in Fig. 3, so that the superposed stack of disks will form vertical channels held in alinement with corresponding openings in the diaphragm 12, so that any dirt and foreign matter caught between the filtering disks may travel down into the catch basin 8 located below.

It is to be noted that the casing of the filter 1 may comprise a body portion 26, and the heads 8 and 19 secured thereto. The head 19 may be secured to the body portion by a soldered joint, and the head 8 may be secured to the body portion by a screw-threaded joint indicated at 27, so that they can be readily separated for the purpose of cleaning the contents of the filter.

The utility of the device will be readily understood when taken in connection with the above description. When it is desired to use the filter for filtering purposes, the adjuster 18 is screwed down tight, so that the superposed disks come in intimate contact with each other, and are thus held tightly. The faucet 3 can be then turned on, and the stream of liquid passing up the passage 22 will gradually seep between the juxtaposed disks and enter the annular passage surrounding the stack or pile of disks and come out through the outlet nozzle 16. Any heavy slime or dirt which collects along the sides of the passage 22 will gradually flow down into the catch-basin 8. The same is true of the material which collects between the disks, which will come down through passages formed by the superposed perforations in the disks, and will enter the catch-basin 8, where the accumulated refuse can be blown out from time to time through the pet-cock 10.

The perforations are quite effective in separating particles of dirt and other solid particles from the water. It appears that when a solid particle lodges in one of the perforations, the pressure of the water is no longer directly upon the particle, and hence, the particle has nothing to force it outwardly. In actual practice I find that the perforations have quite a marked tendency to gather the dirt and pass it downwardly into the catch basin.

When it is desired to use the full head of the fluid without filtering, it is merely necessary to loosen up on the adjuster 18, so that the liquid under a head will separate the disks 14 and pass freely between them from the passage 22 to the annular passage surrounding the disks. In doing so, it will also wash out any material accumulated between the disks and thus cause the filter to be self-cleaning.

While I have shown one embodiment of my invention, I do not wish to be limited to the specific details thereof, but desire to be protected in various changes, alterations and modifications which may come within the scope of the appended claims.

Having thus described my invention, I claim as new and desire to secure by Letters Patent:—

1. The combination with a casing, of a series of disks arranged in a stack face to face, each of the said disks having a plurality of openings therein, the openings in the disks when they are stacked being registering whereby continuous internal passages are provided in the stack, the said disks being of less magnitude than the said casing whereby an annular passage is formed around said stack, together with means for engaging some of the said passages for holding the disks in fixed position whereby when fluid is admitted through one of the passages it may be filtered by the said disks, the fluid leaving the filter through the said annular passage.

2. The combination with a suitable casing, of a series of disks arranged face to face within the casing, thereby forming a stack, each of the said disks being provided with an opening therein, the openings in all the disks being registering, whereby a continuous internal passage is formed throughout the stack, said disks being of less magnitude than the casing so that an annular passage is formed around the said stack, other openings in each of the disks, the openings being registering and being in engagement with suitable pins, whereby the disks are kept in registry, the said internal passage being adapted to receive a suitable fluid which is filtered by the said disks, the fluid leaving the filter through the said annular passage.

3. The combination with a casing, of a series of disks arranged in a stack face to face, each of said disks having an opening therein whereby the adjacent openings in the series of disks will form a continuous internal passage in the stack of disks, said disks being of less magnitude than said casing, so that an annular passage is formed around said stack of disks, whereby the fluid being filtered can pass from said internal passage between said disks to said annular passage, said disks having a plurality of perforations therein, and means for holding said disks in register, so that said perforations will extend in alinement to form channels through which the sediment collecting between said disks may pass out from said stack of disks.

4. The combination with a casing, of a series of disks arranged in a stack face to face, each of said disks having an opening therein whereby the adjacent openings in the series of disks will form a continuous internal passage in the stack of disks, said disks being of less magnitude than said casing, so that an annular passage is formed around said stack of disks, whereby the fluid being filtered can pass from said internal passage between said disks to said annular passage, said disks having a plurality of perforations therein, and means for holding said disks in register, so that said perforations will extend in alinement to form channels through which the sediment collecting between said disks may pass out from said stack of disks, said casing being formed with a catch-basin to collect sediment from said stack of disks.

5. The combination with a casing, of a series of disks arranged in a stack face to face, each of said disks having an opening therein whereby the adjacent openings in the series of disks will form a continuous internal passage in the stack of disks, said disks being of less magnitude than said casing, so that an annular passage is formed around said stack of disks, whereby the fluid being filtered can pass from said internal passage between said disks to said annular passage, said disks having a plurality of perforations therein, and means for holding said disks in register, so that said perforations will extend in alinement to form channels through which the sediment collecting between said disks may pass out from said stack of disks, said casing being formed with a catch-basin to collect sediment from said stack of disks, and a valve-controlled outlet for said catch-basin.

6. The combination with a casing, of a supporting diaphragm connected to said casing, a series of disks placed face to face, piled on said diaphragm to form a stack, a pressure-plate engaging the opposite end of said stack, an adjuster for varying the pressure on said pressure-plate, each of said disks having one or more openings therein, and means for holding said disks in register so as to bring said openings in alinement, to form passages through said stack of disks.

In testimony whereof I have signed my name to this specification in the presence of two subscribing witnesses.

EUGENE SEAVEY.

Witnesses:
H. WHITING,
PHILIP D. ROLLHAUS.